(12) United States Patent
Manders et al.

(10) Patent No.: US 12,399,276 B2
(45) Date of Patent: Aug. 26, 2025

(54) MEASURING SEALING QUALITY OF CONNECTIONS IN DOWNHOLE CASINGS

(71) Applicant: DarkVision Technologies Inc, North Vancouver (CA)

(72) Inventors: Graham T. Manders, North Vancouver (CA); Kurt Kolb, Burnaby (CA); Jacob Law, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 755 days.

(21) Appl. No.: 17/373,822

(22) Filed: Jul. 13, 2021

(65) Prior Publication Data

US 2022/0034217 A1 Feb. 3, 2022

(30) Foreign Application Priority Data

Jul. 29, 2020 (GB) ...................... 2011722

(51) Int. Cl.
*G01S 15/88* (2006.01)
*E21B 17/08* (2006.01)
(Continued)

(52) U.S. Cl.
CPC .............. *G01S 15/88* (2013.01); *E21B 17/08* (2013.01); *E21B 47/0025* (2020.05);
(Continued)

(58) Field of Classification Search
CPC ...... G01S 15/88; G01S 15/8945; G01S 7/527; G01S 7/539; G01S 15/89; E21B 17/08; E21B 47/0025; E21B 47/007; E21B 2200/20; E21B 2200/22; E21B 17/1021; E21B 47/00; G01M 3/00; G06F 16/215; G06F 16/587; G06F 18/214; G06N 3/04; G06N 3/08; G06N 3/045; G06N 3/048;
(Continued)

(56) References Cited

U.S. PATENT DOCUMENTS

| | | | | |
|---|---|---|---|---|
| 4,184,562 A | * | 1/1980 | Bakamjian | G10K 11/20 |
| | | | | 73/622 |
| 2015/0198733 A1 | * | 7/2015 | Lie | E21B 47/107 |
| | | | | 367/138 |
| 2021/0270127 A1 | * | 9/2021 | Zhu | G06N 3/047 |

FOREIGN PATENT DOCUMENTS

| | | | |
|---|---|---|---|
| EP | 3241977 A1 | 11/2017 | |
| JP | S63298054 A | 12/1988 | |
| WO | WO-2016145524 A1 * | 9/2016 | ........... E21B 47/002 |

OTHER PUBLICATIONS

Using Ultrasonic Techniques to Accurately Examine Seal-Surface-Contact Stress in Premium Connections Hamilton (Year: 2009).*

(Continued)

*Primary Examiner* — Isam A Alsomiri
*Assistant Examiner* — Sanjida Naser

(57) ABSTRACT

A method and system for inspecting casings in a wellbore to determine a mechanical or sealing quality of casing connections. Casing connections may become mechanically weak or start to leak after some period of use in harsh conditions. A radial array of ultrasound transducers images the casing in-situ to create an ultrasound image, which is analyzed to detect the casing connector then analyzed a sealing band of the connector. Machine learning and image processing methods may be used to analyze the images.

20 Claims, 13 Drawing Sheets

(51) Int. Cl.
<table>
<tr><td>E21B 47/002</td><td>(2012.01)</td></tr>
<tr><td>E21B 47/007</td><td>(2012.01)</td></tr>
<tr><td>G01M 3/00</td><td>(2006.01)</td></tr>
<tr><td>G01S 15/89</td><td>(2006.01)</td></tr>
<tr><td>G06F 16/215</td><td>(2019.01)</td></tr>
<tr><td>G06F 16/587</td><td>(2019.01)</td></tr>
<tr><td>G06F 18/214</td><td>(2023.01)</td></tr>
<tr><td>G06N 3/04</td><td>(2023.01)</td></tr>
<tr><td>G06N 3/08</td><td>(2023.01)</td></tr>
<tr><td>G06T 7/00</td><td>(2017.01)</td></tr>
<tr><td>G06T 7/73</td><td>(2017.01)</td></tr>
<tr><td>G06V 10/44</td><td>(2022.01)</td></tr>
<tr><td>G06V 10/82</td><td>(2022.01)</td></tr>
<tr><td>G06V 20/10</td><td>(2022.01)</td></tr>
</table>

(52) U.S. Cl.
CPC .............. *E21B 47/007* (2020.05); *G01M 3/00* (2013.01); *G01S 15/8945* (2013.01); *G06F 16/215* (2019.01); *G06F 16/587* (2019.01); *G06F 18/214* (2023.01); *G06N 3/04* (2013.01); *G06N 3/08* (2013.01); *G06T 7/0002* (2013.01); *G06T 7/74* (2017.01); *G06V 10/454* (2022.01); *G06V 10/82* (2022.01); *G06V 20/10* (2022.01); *E21B 2200/20* (2020.05); *E21B 2200/22* (2020.05); *G06T 2207/10132* (2013.01); *G06T 2207/20081* (2013.01); *G06T 2207/20084* (2013.01)

(58) Field of Classification Search
CPC .................. G06T 7/0002; G06T 7/74; G06T 2207/10132; G06T 2207/20081; G06T 2207/20084; G06T 2207/30136; G06V 10/454; G06V 10/82; G06V 20/10; G01N 29/04
See application file for complete search history.

(56) References Cited

OTHER PUBLICATIONS

Al-Shehri DA. Oil and Gas Wells: Enhanced Wellbore Casing Integrity Management through Corrosion Rate Prediction Using an Augmented Intelligent Approach. Sustainability. 2019; 11(3):818. https://doi.org/10.3390/su11030818 (Year: 2019).*
Applied Ultrasonic Technology in Wellbore-Leak Detection and Case Histories in Alaska North Slope Wells Johns (Year: 2009).*
Ernens, D., et al., "On the Sealability of Metal-to-Metal Seals With Application to Premium Casing and Tubing Connections", SPE Drill & Compl, vol. 34 (04), Jul. 2, 2019, pp. 382-396.
GB Search Report received for Application No. GB2011722.2, mailed on Sep. 10, 2020, 1 page.

* cited by examiner

MEASURING SEALING QUALITY OF CONNECTIONS IN DOWNHOLE CASINGS

RELATED APPLICATIONS

The present application claims priority to United Kingdom Patent Application No. GB2011722.2 filed Jul. 29, 2020 which is incorporated by reference in its entirety.

FIELD OF THE INVENTION

The invention relates generally to inspection of casings in a well, in particular using ultrasound tools to inspect casing connections and determine the sealing quality.

BACKGROUND OF THE INVENTION

In oil and gas wellbores, metal casings line the inside to move fluids, provide borehole stability, and isolate the surrounding environment from well fluids. Casings are made-up, that is connected at their ends, by connections, which are typically dual female-threaded short sections of casing. One end of the connection may be tightened to a first casing in a factory and then tightened to a second casing in the field using a top drive.

API Connectors are a common device for connecting casing together using tapered threads. The threads provide the load-bearing and fluid sealing. In Premium Connections, after the threaded portion, there is a metal-to-metal interface, which provides fluid sealing due to high contact pressures. The quality of the connect may not be apparent upon initial make-up. Ultrasound is used to determining connection quality in the factory. (ISO) 13679/API 5C5 details one such process for evaluating casing connections. An operator locates an ultrasound testing device at the spot of the connection and rotates the ultrasound sensor around, with a coupling gel disposed therebetween.

Once the made-up casings are in place and in use, they experience high temperatures, temperature changes, high pressures, chemical attack, twisting, bending and axial strain. This leads to several failure modes including scratching, torque loosening, fatigue, galling, welding of surfaces, and eventually leaking through the connection.

Thus there is desire to determine the quality of the connection in service. However, compared to the above standard process, there is no access for a tool around the outside of the casing, no ultrasound coupling gel, nor even a simple way to locate the connection within the kilometers of casings.

SUMMARY OF THE INVENTION

The inventors propose a device and method of logging a very long casing strings in-situ in the well, determining the locations of connections, imaging said connection, and determining a quality of the connection.

In accordance with a first aspect of the invention there is provided a method of inspecting casing in a wellbore comprising: deploying an imaging tool into and axially thru casings of the wellbore; imaging the casing with a radial array of ultrasound transducers to create an ultrasound image; analyzing the ultrasound image to detect features of a casing connector; locating a band of the ultrasound image at a predetermined offset from the detected features; and analyzing the band of the image to determine a connection quality of the casing connector with the casing.

In accordance with a second aspect of the invention there is provided an imaging system for inspecting casing connections in a wellbore comprising: an elongate body disposable in a casing; means for moving the body axially through the casing; a radial array of ultrasound transducers connected to the elongate body; a memory for storing ultrasound images from the array as it is deployed through the casing. A processor is arranged to process the ultrasound image in the memory by: analyzing the ultrasound image to detect features of a casing connector; locating a band of the ultrasound image at a predetermined offset from the detected features; and analyzing the band of the image to determine a connection quality of the casing connector with the casing.

The band may be a sealing band next to the features, which sealing band corresponds to a metal-to-metal sealing interface between the casing and a casing connector and wherein analyzing the band of the image comprises determining a sealing quality of the casing connector with the casing.

The band may correspond to a plurality of threads connecting the casing and casing connector and wherein analyzing the band of the image comprises determining a mechanical connection strength of the casing connector with the casing.

The feature of the casing connector may be at least one of: threads, a torque shoulder, and a dope relief.

The method and system may filter out reflections in the ultrasound image from the inner and/or outer surfaces of the casing.

The method and system may convert a magnitude of reflection energy in the ultrasound images to a sealing contact pressure.

Analyzing the images may comprise identifying a spiral of alternating high-intensity/low-intensity reflections in the ultrasound images.

The method and system may determine a baseline signal strength of reflections from the inner surface of the casing proximate the connection and modifying portions of the ultrasound image of the casing connector using the determined baseline.

The sealing quality may be determined inversely with respect to signal intensity and from continuity of the sealing interface.

Analyzing the images may comprise processing the ultrasound images with a machine learning model to output a prediction or classification that a given image contains said casing connection and/or the connection quality of that casing connection.

The array may be arranged on a frustoconical surface with a cone angle of 0-40° to sonify the casing at an angle of incidence of 0-20°.

The method and system may estimate a leakage parameter based on the determined connection quality and a leakage model.

The tool may image the casing in a first imaging mode and images the sealing band in a second imaging mode.

The system may further comprise storing a machine learning model and processing the ultrasound images with the machine learning model to output a prediction or classification that a given image contains said casing connection and/or the connection quality of that casing connection.

Thus preferred embodiments of the invention enable the device to evaluate casing connections while still in the well.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

DETAILED DESCRIPTION OF THE PREFERRED EMBODIMENTS

With reference to the accompanying figures, devices and methods are disclosed for capturing, processing, and storing ultrasound reflections from downhole casings and their connections by an ultrasound transducer array. This casing has an elongate, cylindrical form factor through which the device can move longitudinally. The device typically also has an elongate form factor and is sized to be deployable within the casing. The casing is inspected in-situ in a wellbore, having been used in oil production for some time and subjected to many stresses.

Figure 1:
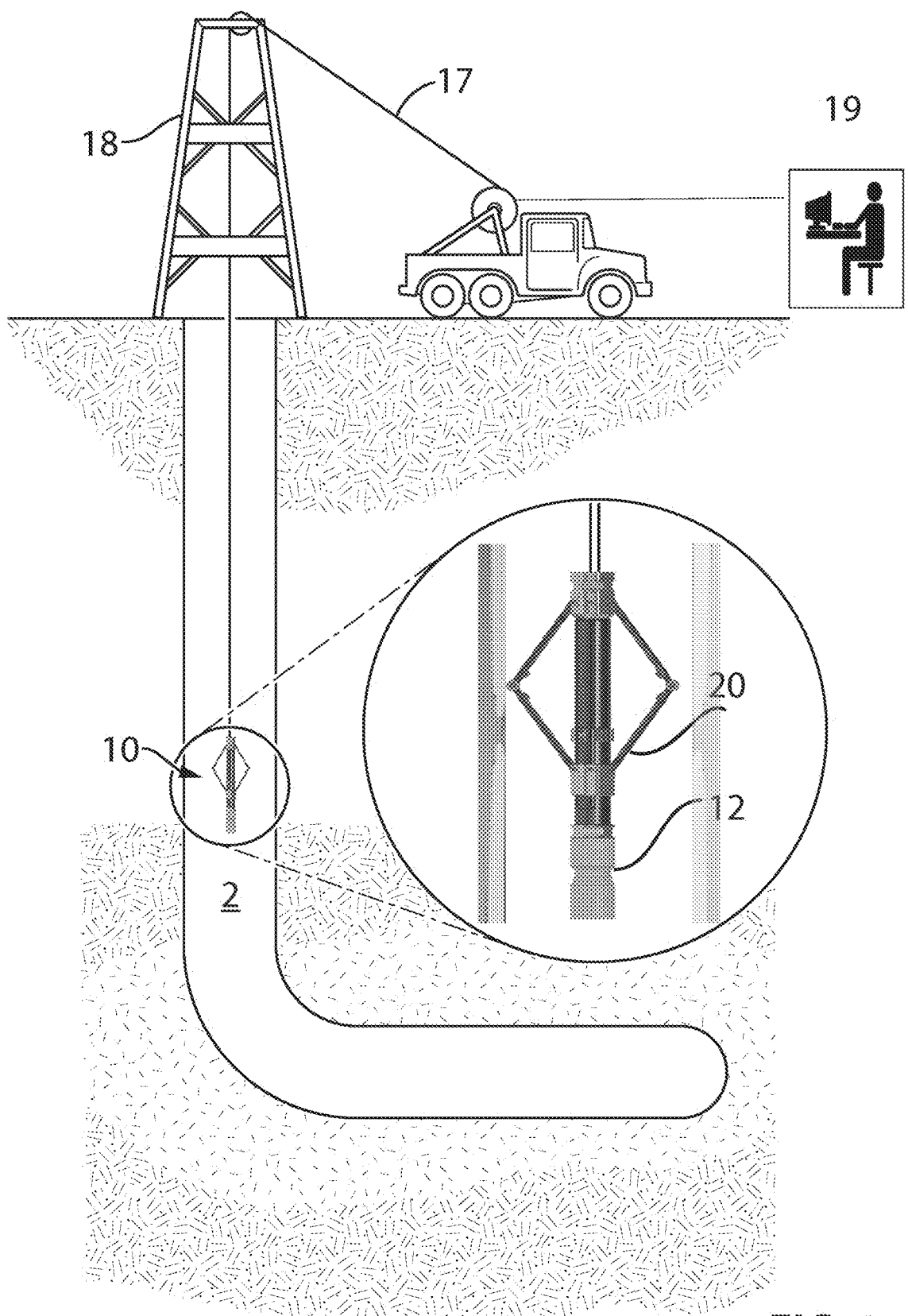
FIG. 1 is a cross-sectional view of an imaging device deployed in a wellbore in accordance with one embodiment of the invention.
Figure 2:
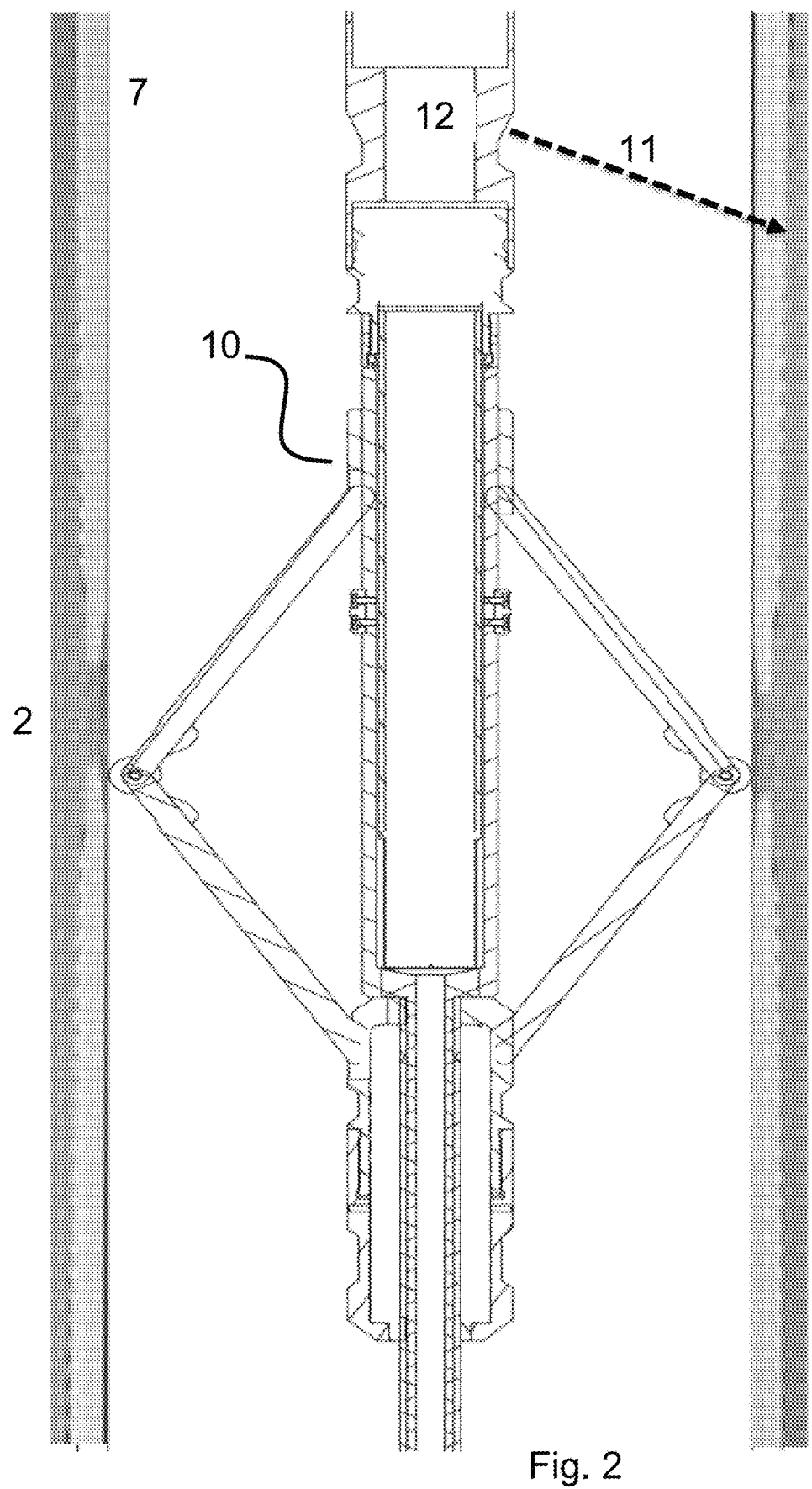
FIG. 2 is a cross-sectional view of an imaging device in a well.

In accordance with one embodiment of the invention, there is provided an imaging device 10 for imaging a casing 7 of a wellbore, as illustrated in FIGS. 1 and 2. The imaging device 10 generally comprises a transducer array 12, a housing, a processor 14, a deployment system 17 and one or more centralizing elements 20.

The imaging device is deployed and moved axially through the casing, imaging as it moves. The images are processed, preferably in real-time, to locate the connections by reflections off features of the connections, such as groves or threads. Within some predetermined offset from the threads 5, the sealing band is assumed to be located. Ultrasound images of this sealing band are captured and analyzed to output a metric for the sealing band's quality.

Figure 8:
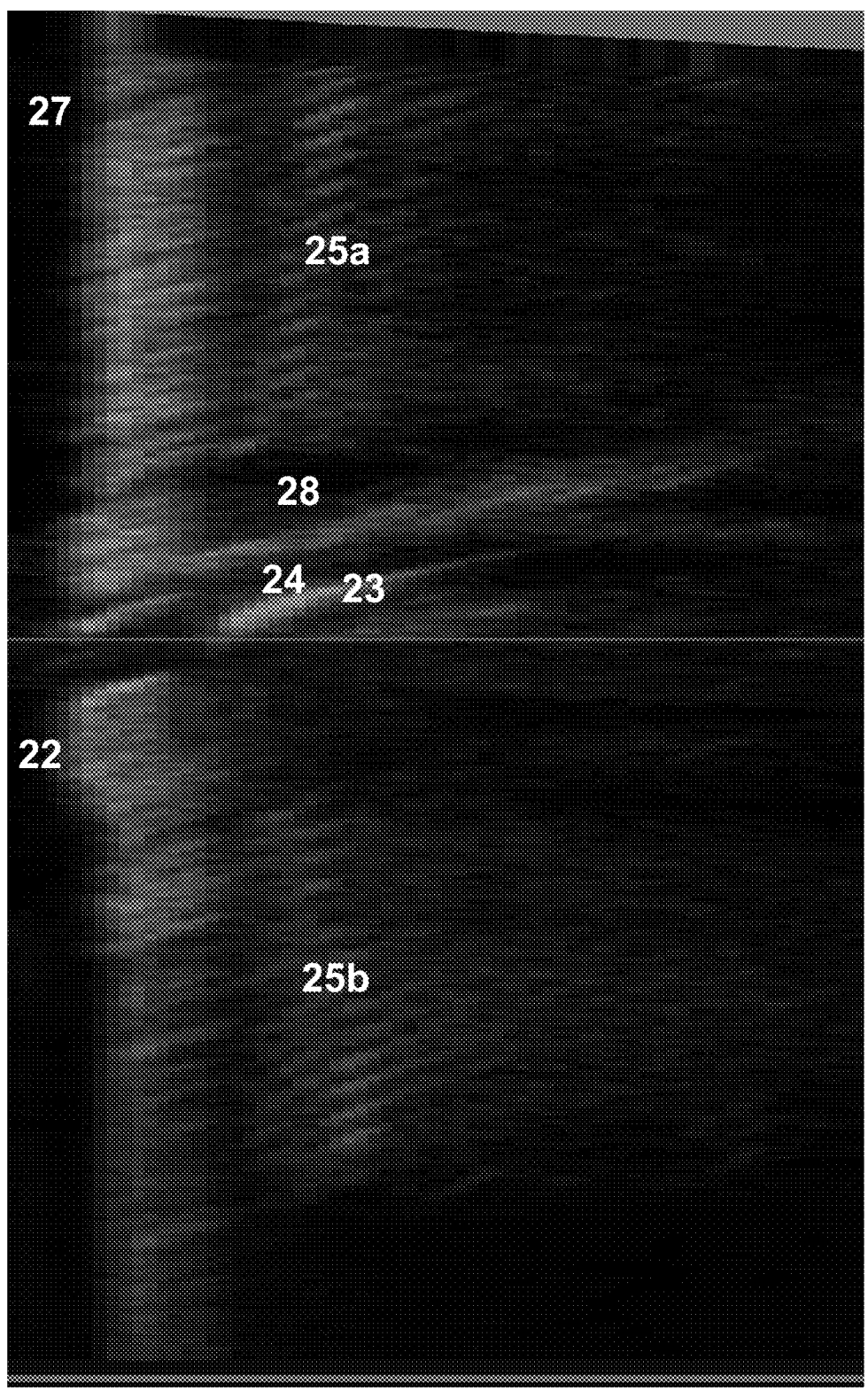
FIG. 8 is an ultrasound image of a casing in a Z-R projection.
Figure 9:
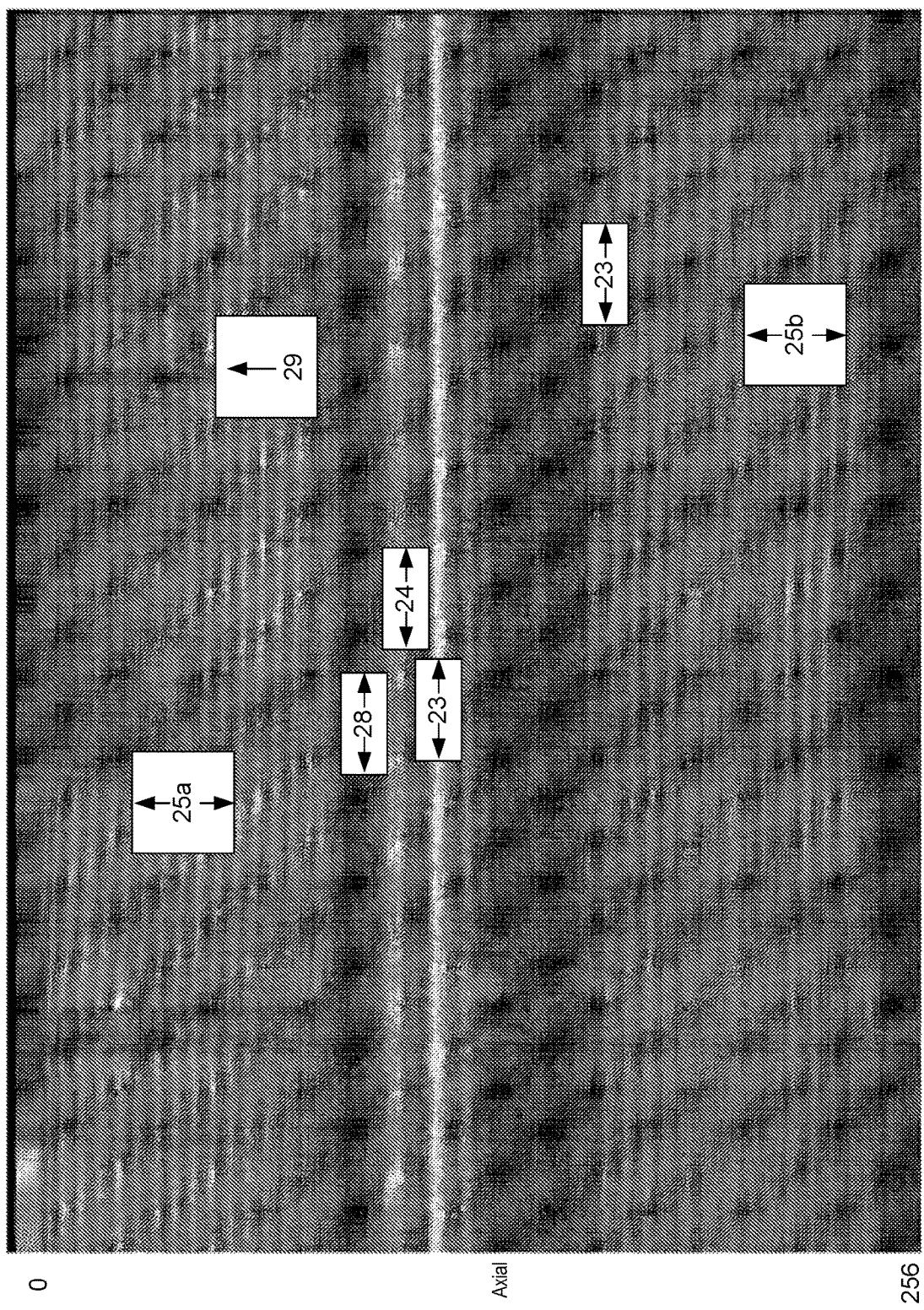
FIG. 9 is an ultrasound image of a casing in a Θ-R projection.

The quality metric may be sealing contact pressure, radial sealing continuity, thread torque, mechanical strength, or leak estimation. The analysis of the threads and sealing band may be performed by a human operator or a computer. If the threads are located in real-time, i.e. while the device is downhole and still near the connection, the device may operate in two imaging modes: a first mode to capture threads and a second mode to capture the sealing band. The first mode may be a lower resolution, as the thread reflections are typically quite distinct, having intense glints over a repeated pattern. FIG. 9 is an unwrapped ultrasound image (Z, Θ axes), where 25a, 25b capture the glints from the edges of threads. The threads are also clear in a side-view (Z-R axes) of FIG. 8.

In the second imaging mode, a location near the assumed sealing band may be captured after the threads are identified. Preferably the second imaging mode is at a higher resolution (azimuthal and/or axial), with incidence angle set to optimize reflections 24 from the uphole and downhole tapered sealing surfaces 4. Small incidence angles, preferably less than 20°, are better at discerning features of connectors because they reveal depth features rather than surface features. Thus the radial array may be purely radial or be a frustoconical array having a cone angle up to 40°.

Note, that while the lengths of casings may be known a priori, it is difficult to move the imaging tool 10 with a precision of 1 cm to the next sealing band 10 m uphole. Thus well models are of limited value to in-situ inspection operations.

The ultrasound transducer produces a voltage signal related to the reflected wave, which is itself a function of the interface between two materials (metal-fluid or metal-metal). In the case of a metal-to-metal sealing, increasing contact pressure passes more of the wave therethrough and reflects less signal back to the transducer.

The well fluid attenuates the acoustic wave to a greater extent and with more variably than would be the case for prior external contact inspection methods. This inverse pressure-reflection relationship and attenuation can be determined empirically or theoretically, then provided as a computer model in order to calculate the contact pressure at a sonified spot.

The sealing quality of the sealing band may also be calibrated relative to signal reflections 27 from non-sealing areas of the casing. For example, the signal intensity from the inner surface of the casing may be seen as the maximum signal receivable after accounting for fluid attenuation. Similarly, reflections 25 from the band of threads indicate points of alternating high and low contact stress and thus low and high signal intensity. These thread reflections 25 are distinctive in being continuous in azimuth Θ with repeated pitch in longitude Z.

In addition to identifying the location of threads from the distinctive reflections 25, the torque in the threads may be estimated from the intensity of the reflections (or relative intensity). As exemplified in FIG. 9, thread reflections 25a are less intense than thread reflections 25b due to higher and lower torque respectively.

It is preferable to calibrate signals on a per-scan line basis within a meter of each other, in order that tool eccentricity, transducer sensitivity and fluid parameters are most consistent.

The sealing quality analysis may be processed as a function of contact pressure (via reflection signal intensity). Sealing quality may be ascribed maximum or minimum values beyond certain threshold contact pressures.

Figure 10:
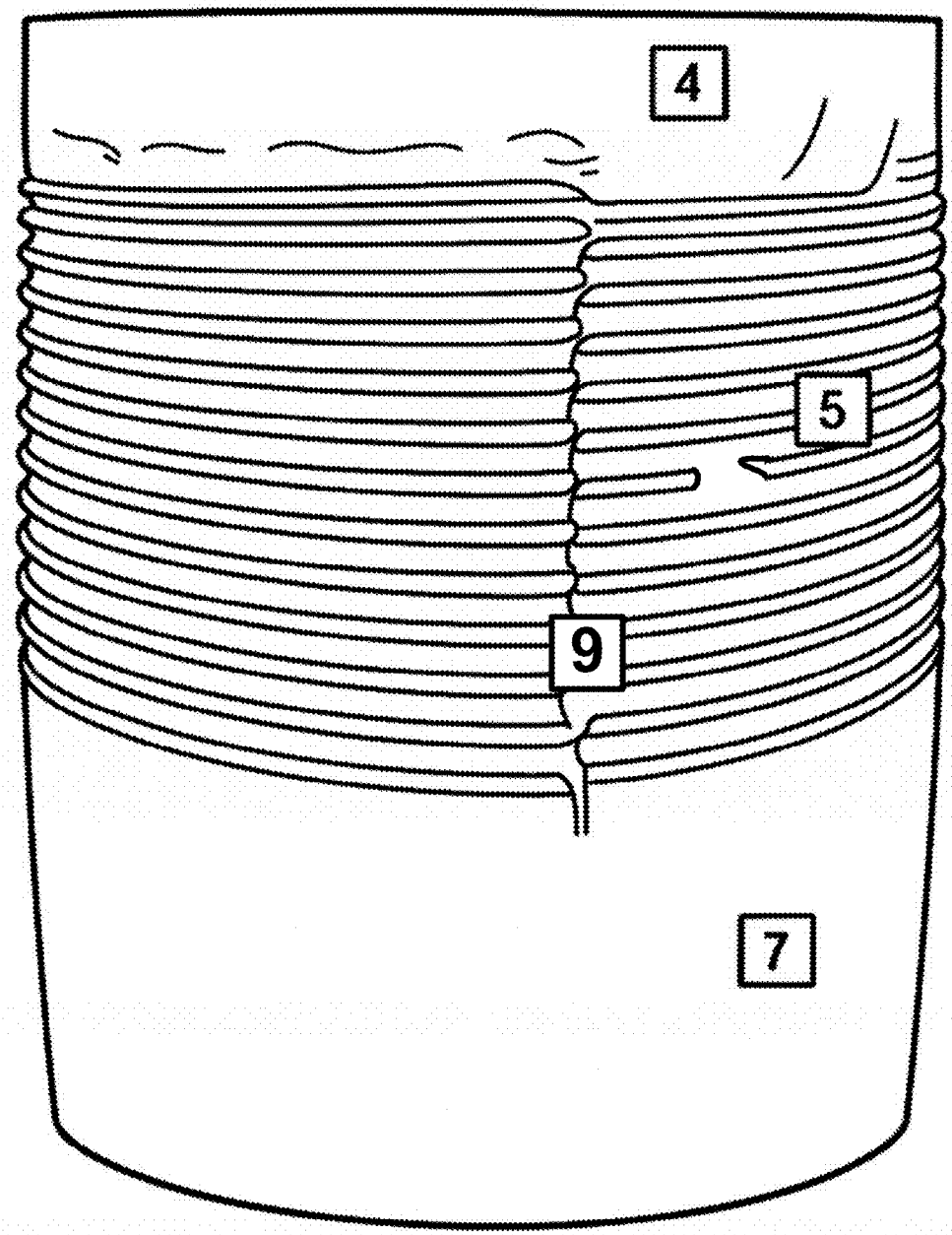
FIG. 10 is a drawing of a Premium Connection with a leak path.
Figure 11:
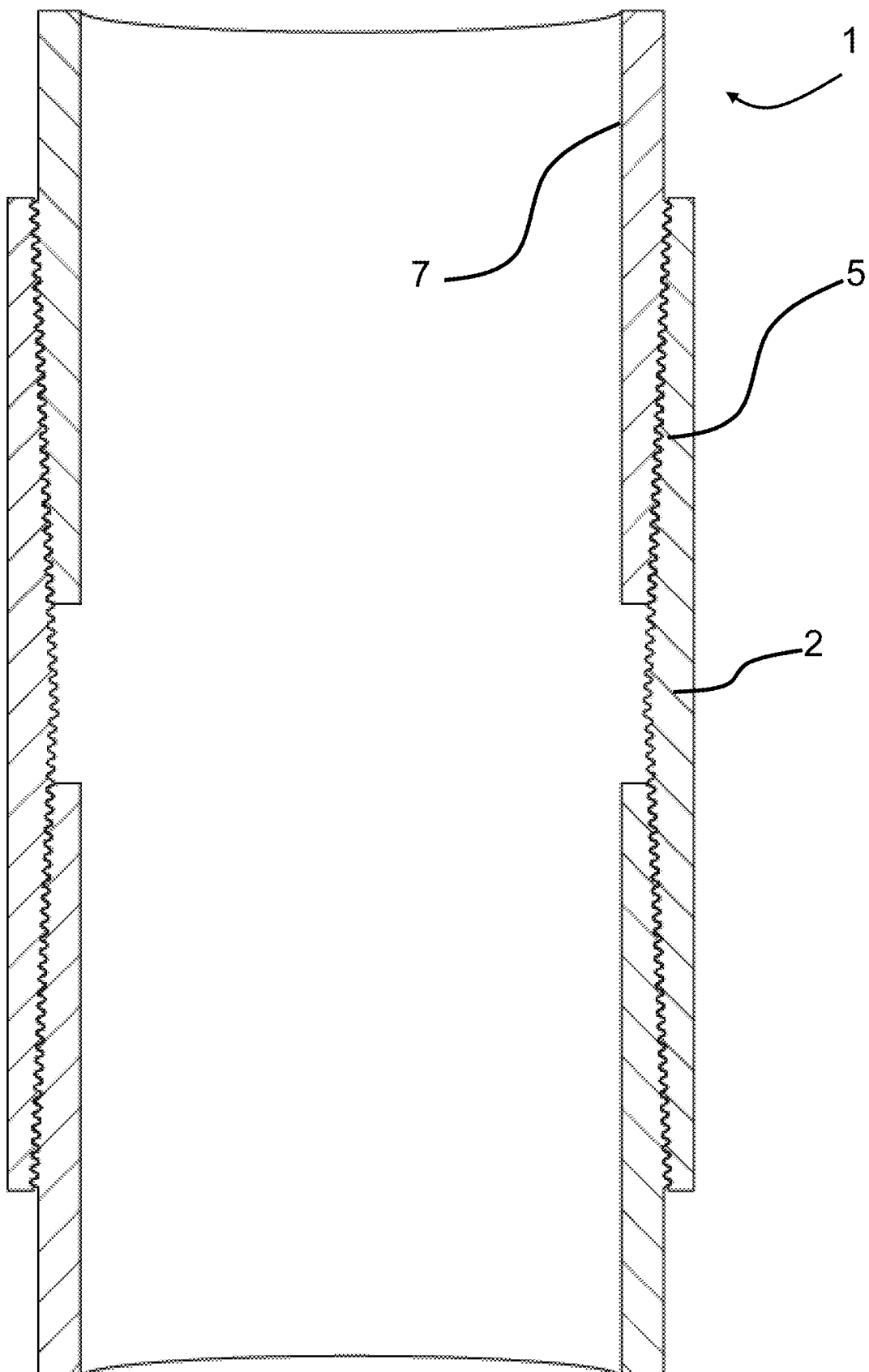
FIG. 11 is a section view of an API casing and connection.

Sealing quality metrics may be made by computing statistics for the overall contact pressure over the sealing band. In preferred computations, sealing metrics are made on a pixel-by-pixel basis within the sealing band and determining whether a potential leak path exists from uphole to downhole through the sealing band. A potential leak path may be considered a substantially contiguous loci of pixels having sufficiently low sealing quality. FIG. 9 shows a distinctive missing reflection area 29, corresponding to groove 9 in FIG. 10. The physical groove 9 could represent a leak problem and the continuity of the missing reflections 29 (i.e. area of low intensity) through the thread reflections 25b is processed to identify a leak path and estimate a leak rate.

The beam focus is preferably set to converge at the casing surface or inside the casing, where the threads and sealing surface are located. Reflections from the casing inner surface are useful for locating the casing but these typically have little information about connection quality.

While threads provide a distinctive indication of the existence of a casing connection, other features provide significant signature reflections, which help locate the connection. The dope relief channel 8 or torque shoulder 3 may also return a strong reflection over the whole circumference of the connection.

A well is typically several kilometers long but certain physical aspects about the casing are pre-known or assumed, such as the casing diameter, casing length, connection type, thread count and pitch, expected connection torque and pressure, and offset distance from threads to sealing band. Thus the device can be preprogrammed to beam focus at the correct diameter, logging at a rate and resolution that will capture threads of the given pitch, which threads are a given offset from the sealing band and offset from the next casing connection by the given casing length.

Moreover, during the sealing analysis the expected sealing contact pressure can be compared to the measured sealing contact pressure, preferably across several connections to output a relative sealing quality metric, such as expected-to-measured contact pressure ratio, histogram of measured contact pressures, or calibration of sealing contact pressure measurements.

Transducers

Figure 3:
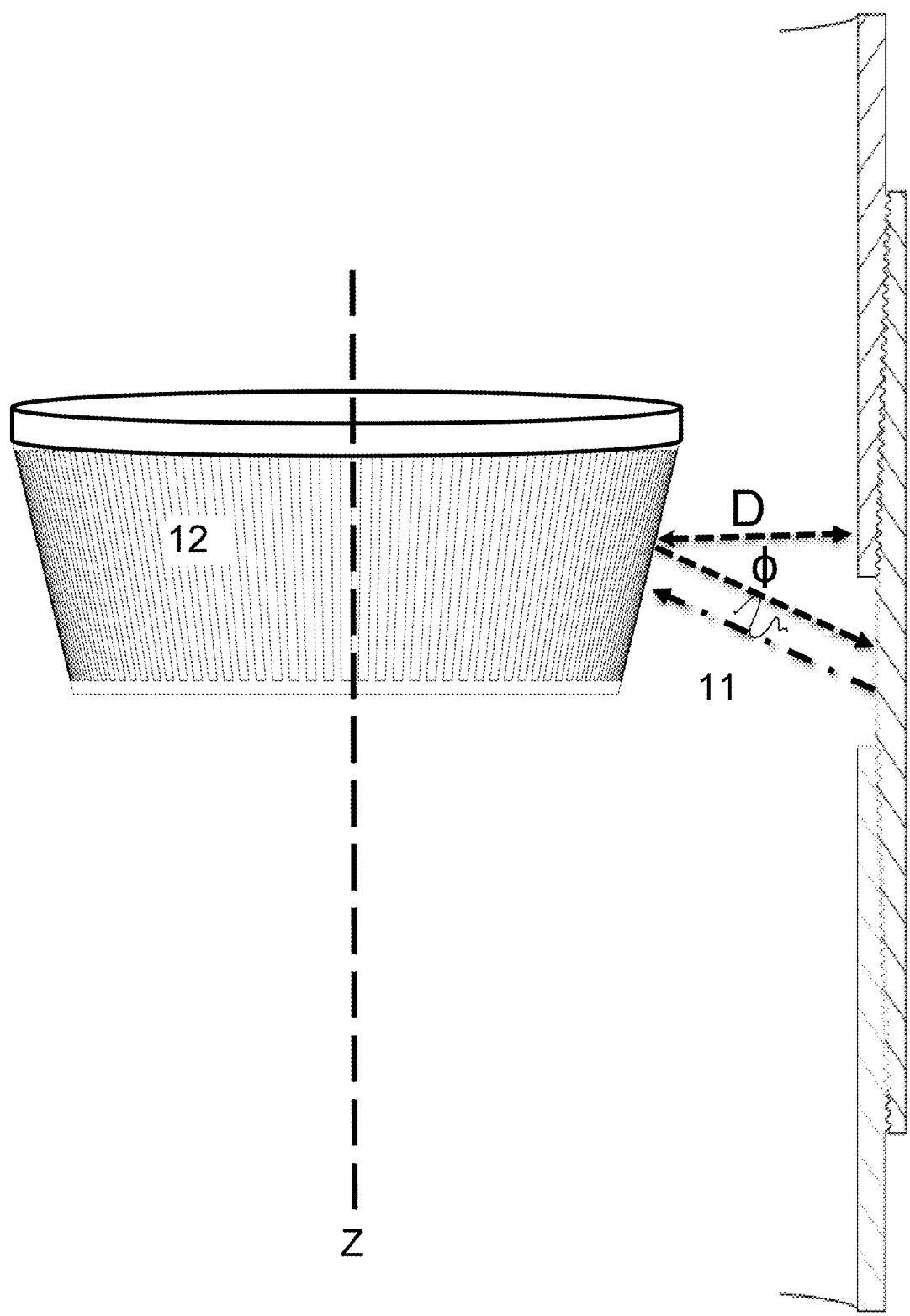
FIG. 3 is a cross-sectional view of a radial acoustic array in a conical arrangement.

The array comprises a plurality of acoustic transducer elements, preferably operating in the ultrasound band, preferably arranged as an evenly spaced one-dimensional radial array 12 (see FIG. 3). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features. The transducers may be piezoelectric, such as the ceramic material, PZT (lead zirconate titanate). Such transducers and their operation are well known and commonly available. Circuits 14 to drive and capture these arrays are also commonly available.

An axial resolution of less than the thread pitch is desirable, so 1-2 mm resolution is used in preferable embodiments. The axial resolution is determined by the focal spot of scan lines, the logging speed and frame frequency. In preferred embodiments, the focal spot is less than 2 mm, more preferably less than 1 mm. The frame rate is preferably greater than 100 fps, more preferably greater than 170 fps.

To identify the threads, circumferential (azimuthal) resolution is not as critical, as the presence of simply portions of plural threads is enough to distinguish them from other casing features. However, circumferential resolution is important to analyze the continuity of the sealing band, where a leak path of a few millimeters or a few angular degrees would be cause for concern.

Thus preferably each transducer array is made up of 128 to 1024 elements. Multiple transducer elements, per aperture, operate in a phase delayed mode to generate a scan line 11. There may be as many scan lines as elements by changing the aperture by a single element for each scan line.

The transducer elements may be distributed radially, equidistant around the body of the device. As seen in FIG. 3, the transducer elements may be substantially outward, radially-facing. A first reflection is received from the inner wall and then a second reflection is received from the connection threads and sealing interface. However, there may be multiple reflections as the wave bounces between walls. A receive window Rx is pre-set by the operator or device for when the processing circuit 14 should start and end recording of reflected waves. For example, in the case of a large diameter, thick casing in fluid with a slow speed of sound, the device can start recording later and for longer.

This transducer arrangement captures a ring-shaped cross-sectional slice of the casing covering 360° around the array 12 and is useful for penetrating the casing to highlight the connection features. As the device is moved axially in the casing, in either direction (±Z), the ring-shaped transducer continually captures slices (i.e. frames comprising the scanlines) of the casing that are perpendicular to the longitudinal axis of the casing. Thousands of these slices are combined to create a 3D visualization of the connection.

Scan Frame

An acoustic transducer element can both transmit and receive sound waves. A plurality of transducer elements cooperates as a phased-array to generate a steered and focused wavefront. The apparent origin of the wave can be synthesized within the device, referred to as a 'transmission point,' (or 'transmission center' 22 for a plurality of intersecting scan lines), by the set of transducers, called the aperture 15. The number of scan lines N that make up a full frame may be the same as the number of elements M in the array, but they are not necessarily the same.

Discreet omnidirectional pulses are emitted from the plural transducers, which waves interfere constructively and destructively to produce a wavefront moving in the direction of the scan line. As known in the art, altering the timing of the pulse at each transducer, can steer and focus the wavefront. In steering, the combined wavefront appears to move away in a direction that is non-orthogonal from the transducer face, but still in the plane of the array. In focusing, the waves all converge at a chosen distance from the elements. The location of the convergence is the focal point and the area sonified defines the resolution of the system. FIG. 3 illustrates an example device, whereby 384 scan lines inclined at angle $\phi$, focus at a diameter D (e.g. 12 cm), to create non-overlapping sonified areas of 1 mm resolution.

Image Processing

The ultrasound signals returned from all scanlines create a 3D image, which may be viewed as a continuous image over the whole well or as plural images of each cross-section. On a video display, the ultrasound image may be displayed in two orthogonal 2D projections, such as Z-R (FIG. 8) and Z-Θ (FIG. 9). Aspects of the thread, dope relief and sealing band are apparent in each projection. These images are processed to identify parts of the connection, such as the threads, drop relief, and sealing band. The skilled person may employ techniques known in computing science for this purpose, such as image processing, machine learning or template matching. These images may be processed in real time or after completing the inspection job.

The ultrasound images may be preprocessed or filtered to apply the image processing on the most relevant signals in the image. Noise and non-connection features may also be selected and filtered out via these projections. For example, the processor may remove reflections from the inner and outer casing, leaving mostly reflections from the parts of the connection therebetween. Reflections from the threads, dope relief and sealing band are within these major casing surfaces and provide the most information about the connection state. The system may preprocess the raw ultrasound images using Center-of-mass, average intensity and maximum intensity to convert 3D volumetric data to 2D image of features with 3 channels.

From the time of flight, speed of sound and diameter of the casing, the processor can calculate the expected region of inner and outer reflections. These surfaces may also be known from the first and last strong reflections off these surfaces, which tend to be consistent along the casing. As seen in FIG. 8, these inner surface reflections 22, 27 are the first reflection received and have a consistent distance from the transducer.

In FIG. 9, pixels intensity for each Z-Θ location is the summation over radius R of reflection intensities, preferably limited to radii of the casing and connection, excluding noise from the fluid, ringing, and the rock formation. Alternatively, pixel intensity may be maximum intensity. Alternatively, pixel intensity may be the intensity at a selected radius within the connection, preferably through the threads, dope relief and sealing band. The purpose is to highlight the contrast of the connection features and return a quantitative measure of them to estimate sealing quality.

Machine Learning Model

Figure 12A:
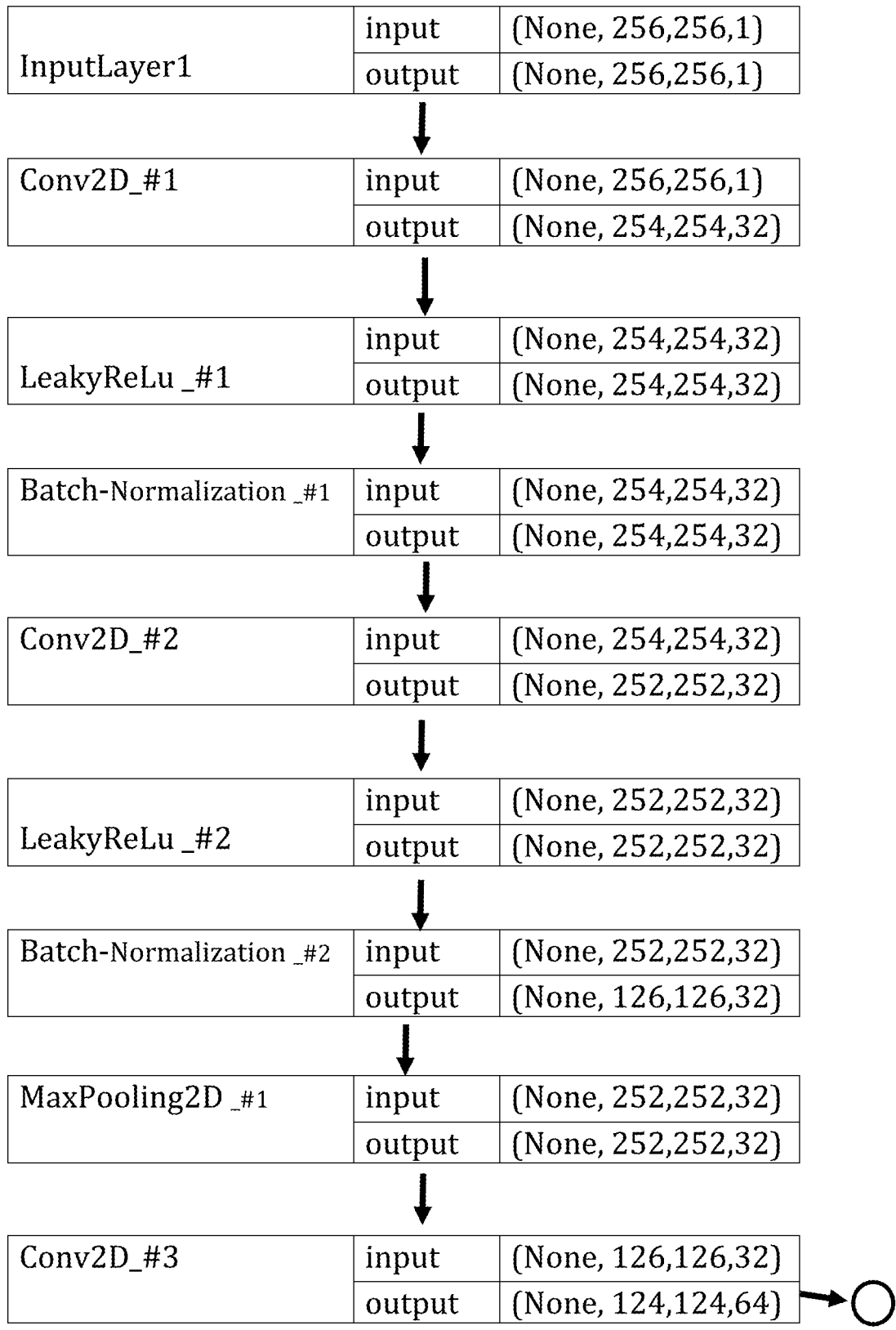
FIG. 12A is a flowchart for a machine learning architecture (start).
Figure 12B:
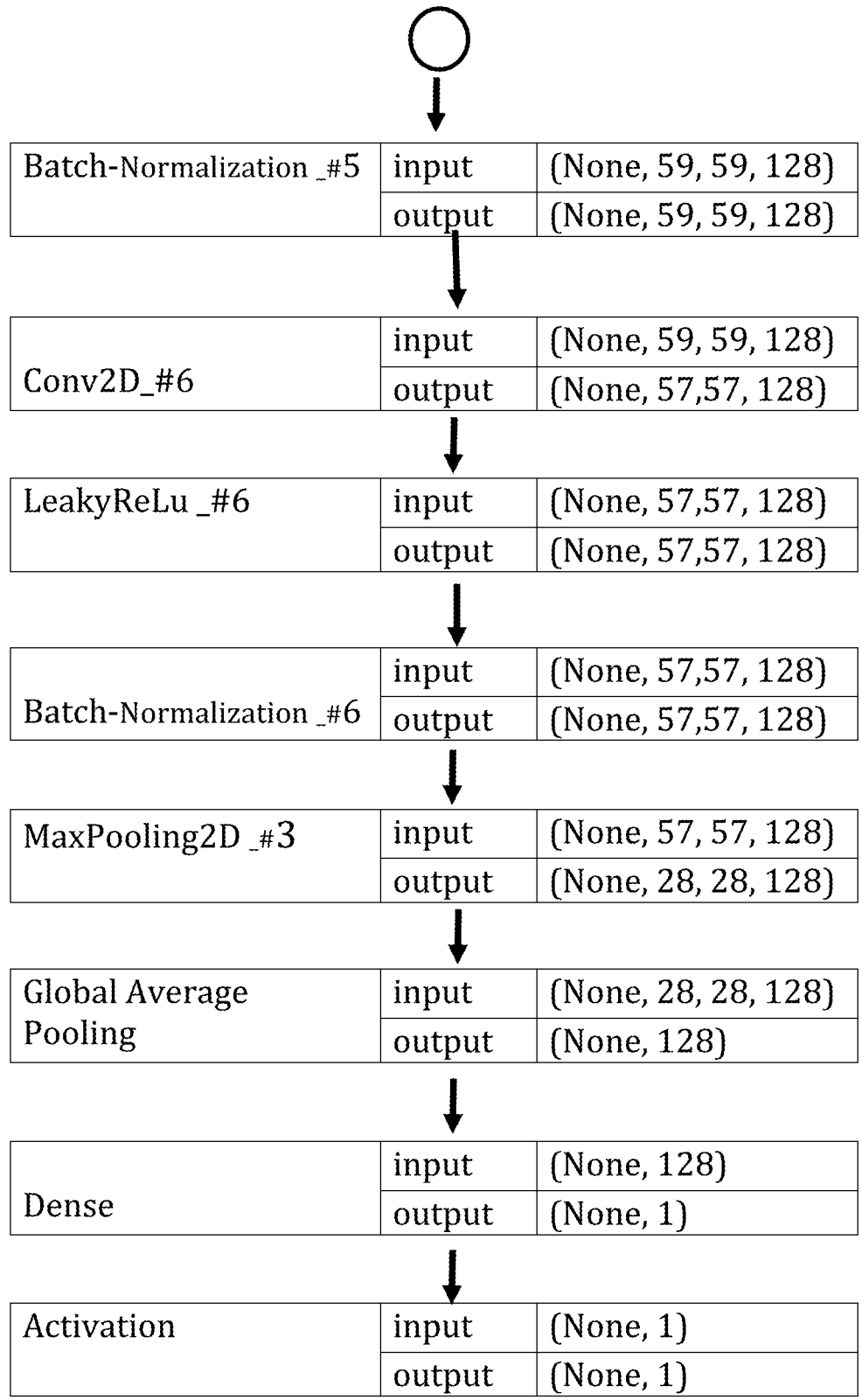
FIG. 12B is a flowchart for a machine learning architecture (finish).

In one embodiment, a processor uses machine learning to build a prediction model about the presence and quality of a sealing band. The model may be trained on ultrasound images of areas of pure casing or connections. Casing connection identification and quality assessment may use a two-stage approach: casing connection identification using a CNN Connection detector module followed by a ResNet-based feature extractor and regression network to assess sealing quality FIGS. 12A and 12B depicts an exemplary CNN architecture for connection detection. The neural network learns a decision boundary separating casing connection images from non-connection images. The input to the connection detector network is a gray-scale image (e.g. 256z×256Θ×1). The network comprises four convolutional layers that capture feature maps with increasing levels of abstraction. For activation functions, the architecture uses ReLU, preferably Leaky Rectified Linear Units (ReLU), to overcome the problem of vanishing gradients which is associated with Sigmoid activation functions. Moreover, Leaky ReLU is preferred over basic ReLU because it prevents the model from getting stuck in the negative region of the ReLU function during the training process. In addition, using Randomized ReLU activation increases the number of trainable parameters, which is not preferred especially if the training dataset is small. The architecture further employs a Batch Normalization layer, which normalizes and scales the input feature maps to each convolutional layer. Batch Normalization layers help in speeding up the training process and reduce the possibility of the model overfitting the training data. Because Batch Normalization helps reduce overfitting, the model does not need Dropout layers.

The architecture also uses Maximum Pooling layers to reduce the dimensions of output feature maps after each convolutional layer. Most conventional CNNs use stacked convolutional layers with increasing depth to extract relevant features and this is followed by two or three Fully Connected layers. In preferred embodiments, the system does not use Fully Connected layers except for the output decision node to avoid overfitting the training data.

Global Average Pooling (GAP) can be used with 3D tensors with varying width and height to 2D tensors, thus effectively reducing (Height×Width×Number_of_feature_maps) to (1×1×Number_of_feature_maps). The architecture may use a GAP layer instead of Fully Connected layers to help the model generalize better for unseen examples. Also using GAP forces the feature maps to be interpretable as they are one step away from the output decision node. Finally, a decision node is used with a Sigmoid activation function. The architecture may employ an Adam optimizer for training the casing connection detector, as it is easier to tune than a stochastic gradient descent optimizer. A stochastic gradient descent with momentum is also an alternative. A learning rate schedular is used to reduce the learning as a function of the current training epoch. The loss function for the optimizer in the case of connection detection is the binary cross entropy function. Moreover, the evaluation metric is the weighted accuracy based on the distribution of connection and non-connection examples in the training dataset.

Certain embodiments of the model may use skipping connections (also called residual units) resulting in two important enhancements. First, by providing alternative shortcuts for gradients to flow during backpropagation, the problem of vanishing gradients is almost eliminated. Second, by incorporating skipping connections, the model is forced to learn an identity function ensuring higher layers perform at least as good as lower layers, hence higher layers never degrade the performance of the model.

Once the system has detected a casing connection in the image segment, the system determines the relative location of the sealing band, which may be a metal-to-metal surface area 4 or some portion of the threads 5. The system may treat this problem as a regression problem, where the input of the network is an image segment containing a casing connection or simply the sealing band and the output is a continuous value of sealing quality. An alternative embodiment formalizes the problem as a classification task, where the output layer corresponds to 256 classes (discrete) of sealing quality.

The system initially builds a training dataset of casing connections with different diameter, connection type, torque and damage. The training set may be generated by data-augmentation of collected, labelled ultrasound images ('connection', 'no connection'). The training set may also comprise augmented images flipped around an axis, changing the brightness and the contrast of the image, without affecting the estimated label.

Additionally, the system may use a ResNet architecture to extract important features. This approach takes advantage of Transfer Learning by loading the 'ImageNet' weights to extract important features from a small dataset of casing connections, then removing the top layers since they are more related to specific classes of objects from the Image Net dataset and were trained on a classification task rather than a regression task. ResNet architecture expects a three-input channel image, hence, the processor may stack the (256×256×1) grayscale image to construct a (256×256×3) image. The ResNet network maps the (256×256×3) input to (1×1×2048) features. The output features are then passed to a regression network consisting of multiple hidden units. The choice of the number of hidden layers and the depth of each layer can be decided using a grid search approach.

After initializing the weights of the ResNet feature extractor with ImageNet weights, there are two preferred options to train this network. The first is to freeze the weights of the ResNet feature extractor, hence, backpropagation will not update these layers and will only update the weights of the top fully connected layers. This approach is most suitable in cases where there is a very small dataset. The second approach is to train the entire network including the ResNet feature extractor but with varying learning rates depending on how deep the layers are relative to the input layer. Specifically, weights associated with layers closer to the output node are updated with a higher learning rate compared to layers further away and closer to the input node. The low-level features, like edges, are relevant to all objects and therefore the system should not update those kernels as much as it updates high level features that are unique to specific tubular objects imaged using ultrasound. Since this is a regression task, the system may optimize the loss function based on mean-squared error.

Instead of treating the problem as a two-step process, first detecting the presence of a casing connection and then determining its sealing quality, the system may comprise a single end-to-end regression network. In this case, the input to the learner is a segment (i.e., could either contain a connection or not) and the output is a real-valued integer. During the labelling phase, every sealing band segment would be assigned a sealing quality, while segments that do not contain connections would be assigned a large negative value so that the mean-squared error loss function is heavily penalized when a connection is misclassified as a non-connection or vice versa.

Sealing Computations

Ultrasound reflections from the sealing band enable observations about sealing quality to be made to estimate leak paths and leakage rate. The ultrasound energy from the sealing band is negatively correlated to contact pressure, and pressure is positively correlated with improving sealing. These correlations can be obtained empirically, statistically, theoretically or via Finite Element Analysis.

Ernens et al. (2019), "On the Sealability of Metal-to-Metal Seals With Application to Premium Casing and Tubing Connections", SPE Drilling & Completion. 10.2118/194146-PA proposes relationships between contact pressure and leakage.

Thus, each pixel/voxel can be converted to a sealing pressure and then a sealing quality value. A leak metric can be determined by identifying a path of contiguous pixels that cross through the sealing band, each pixel having some threshold sealing quality.

The sealing band may be set to the ultrasound reflections from the metal-to-metal sealing area 4 of Premium connections or portions of the threads 7 in API connections that are responsible for fluid sealing (in addition to mechanical coupling).

Deployment System

The imaging device includes a connection to a deployment system for running the imaging device 10 into the well 2 and removing the device from the well. Generally, the deployment system is wireline 17 or coiled tubing that may be specifically adapted for these operations. Other deployment systems can also be used, including downhole tractors and service rigs.

The deployment system may move the imaging tool through the wellbore in a first pass to locate connections, then revisit each connection in second (slower) passes to image the sealing band more precisely.

Effects of Operating Parameters

One key difference between the current practice of testing connection during make-up and the present method is due to the effect of wellbore operating parameters on the casing connections and their quality. The present system and method can be used to qualify the connection quality after long periods of operation or while changing those wellbore parameters. Changes in quality may indicate a potential failure at certain casing connections in the future.

Thus in one embodiment, the tool is used to image and process casing connections as described here after the wellbore has been in use or at intervals of prolonged use. This could lead to annual inspections or event-based inspections to check the effect of certain stages in the life of a well such as installation, perforating, fracturing, production, and abandonment. The operator or computer processor may identify changes and trends in connection quality at one or more connections over time.

In another embodiment, the tool is left in the well, while wellbore operation parameters are varied. Such parameters may include pressurization, heating, and addition of treatments to the well fluid. As these parameters vary, the operator or processor may identify changes or trends in connection quality at one or more connections.

Other Tool Components

Figure 4:
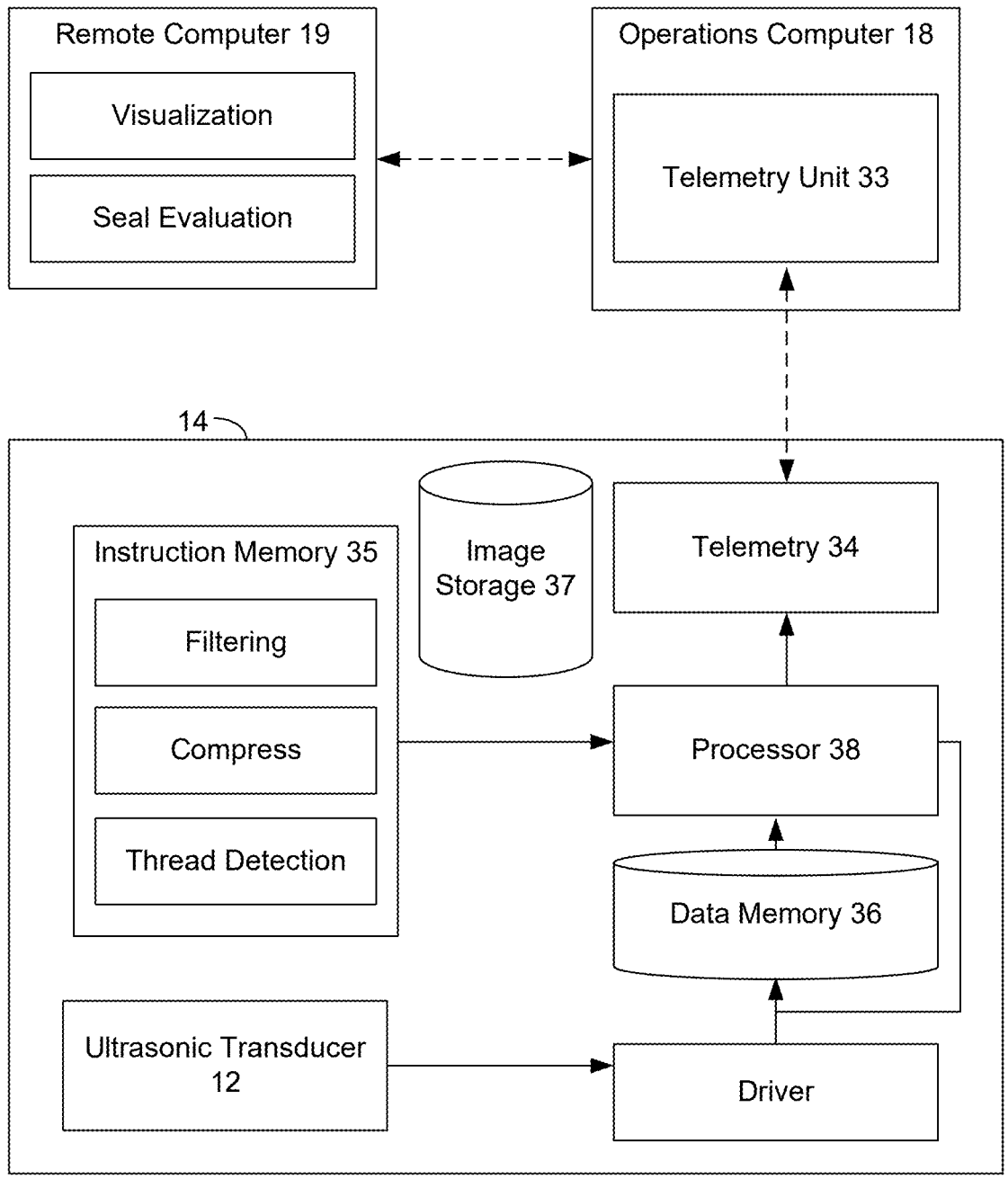
FIG. 4 is a block diagram of subsystems of the imaging device and computing modules.
Figure 5:
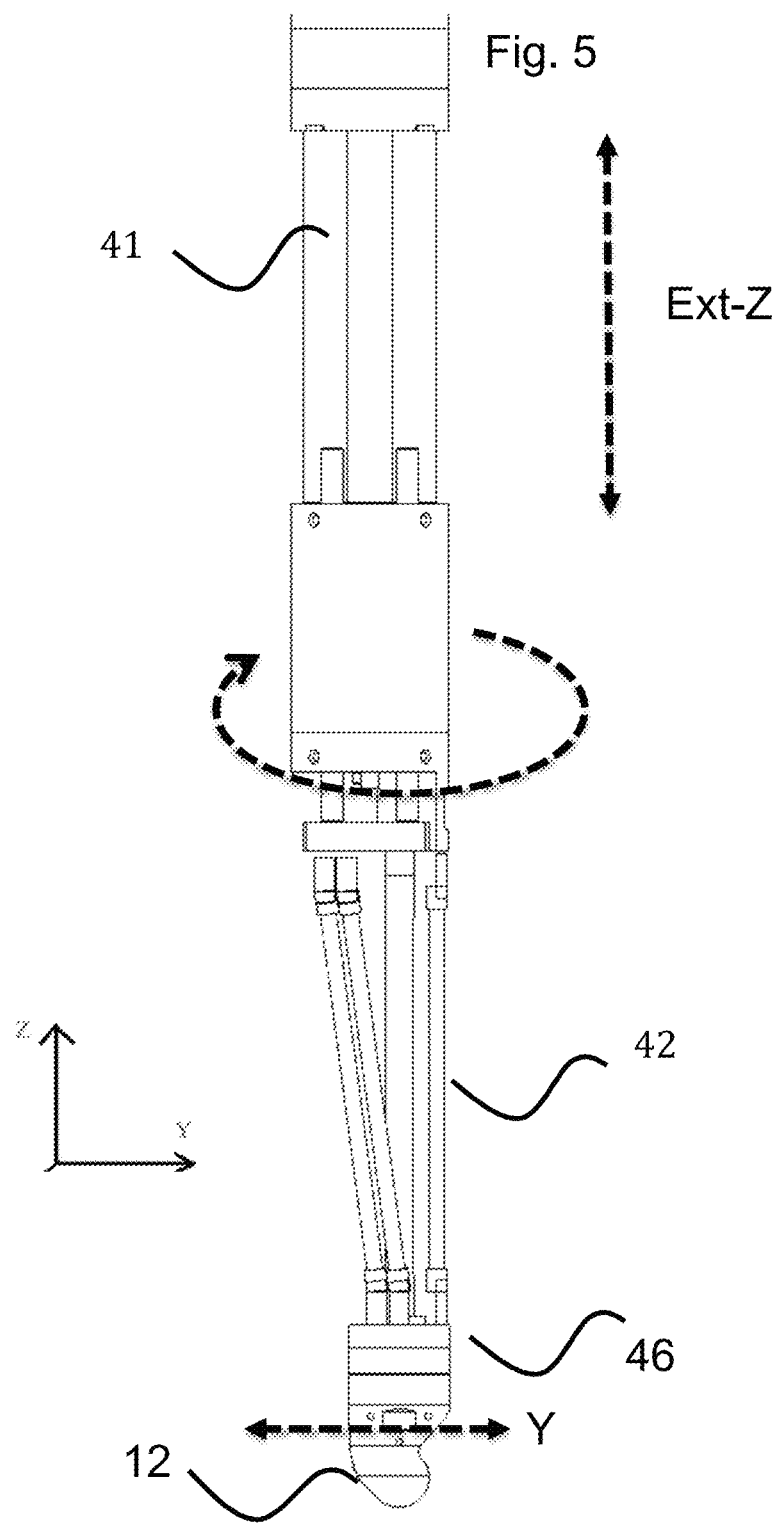
FIG. 5 is a side view of an imaging device having a curvilinear array on a robotic end effector.
Figure 6:
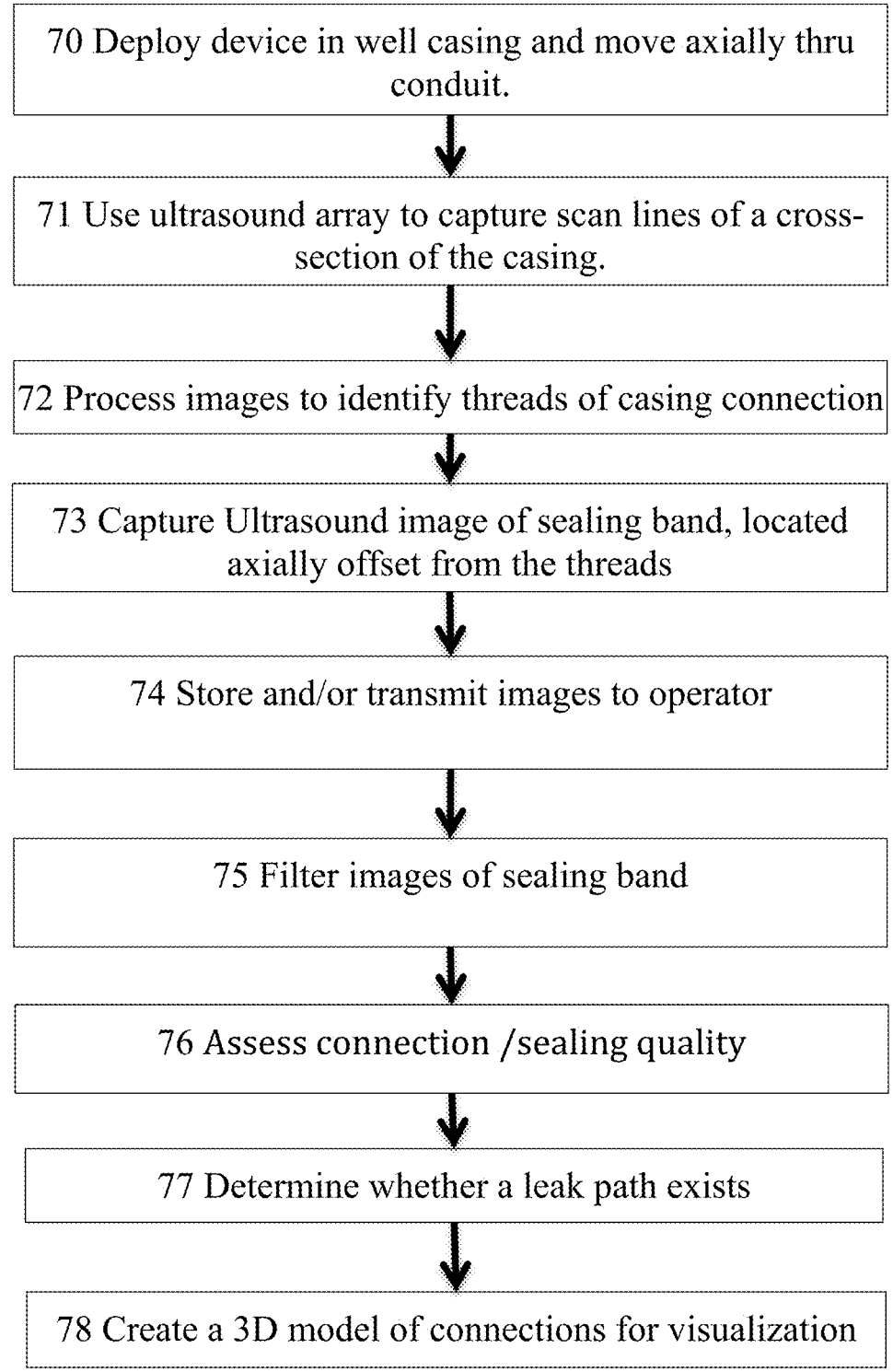
FIG. 6 is a flow diagram for imaging and analyzing connection quality.
Figure 7:
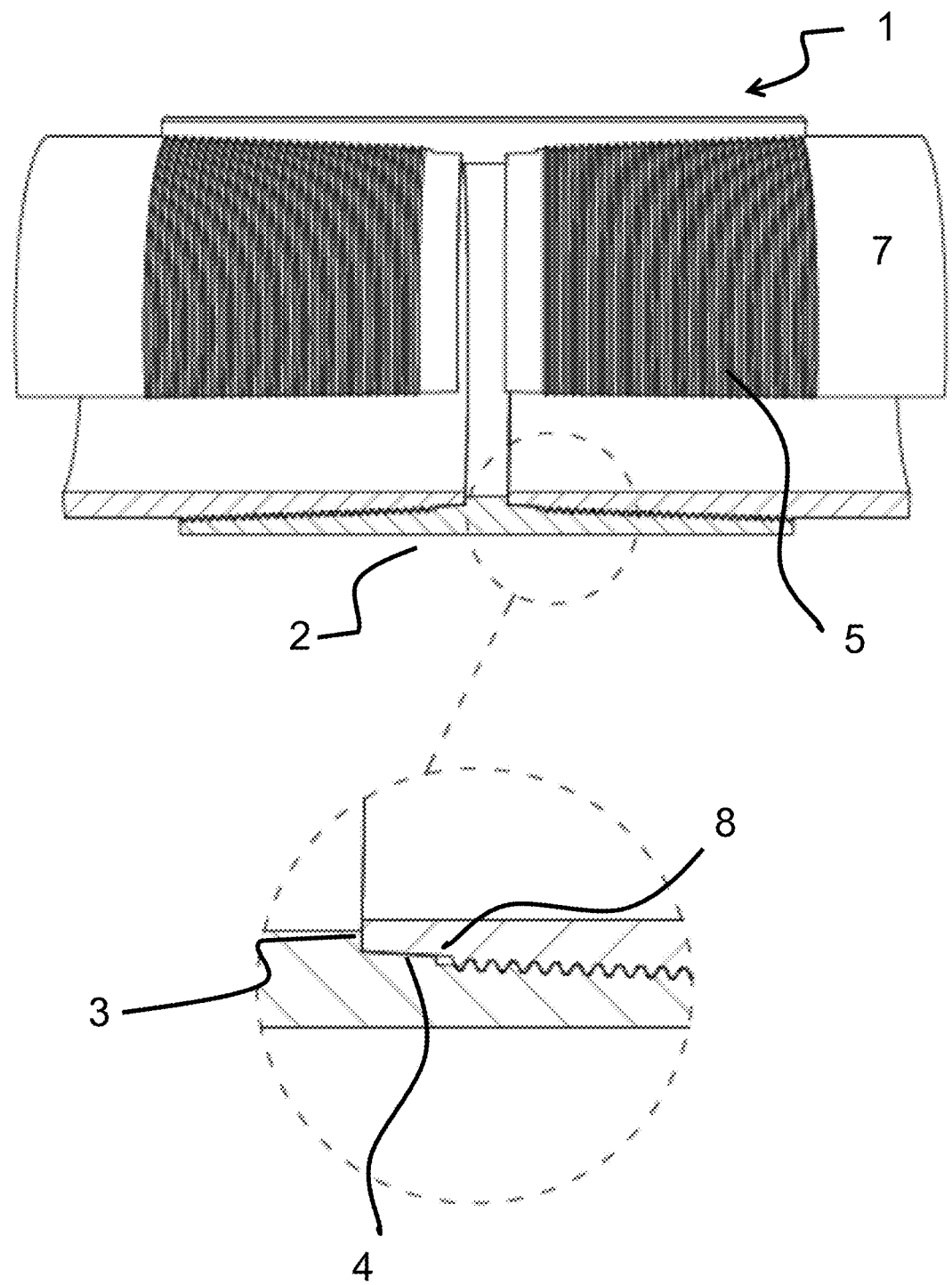
FIG. 7 is a cut away view of a Premium Connection with a close-up view of the connection make-up.

The tool comprises a circuit dedicated to transmitting, receiving and processing ultrasound waves and circuits for processing images and transmitting them. These circuits are common in ultrasound imaging and the skilled person is assumed to be familiar with chips, such as LM96511 from Texas Instruments. The raw, digital data of the transducer is written to Data Memory 36 using the driver, shown in FIG. 4.

Instruction memory 35 comprises logic modules, as software or firmware, to detect threads, filter ultrasound images, compress images, and compute sealing quality. Certain of these modules may be located to the remote computing station 19 for post-processing The images may be stored on non-volatile memory of the device (aka as a Memory Tool). The compressed images may be transmitted over a telemetry unit of the device to a corresponding telemetry unit of the surface computer system.

It will be appreciated that data processing may be performed with plural processors: on the device, at the operations site, or on a remote computer. The term 'processor' is intended to include computer processors, cloud processors, microcontrollers, firmware, GPUs, FPGAs, and electrical circuits that manipulate analogue or digital signals. While it can be convenient to process data as described herein, using software on a general computer, many of the steps could be implemented with purpose-built circuits. In preferred embodiments of the present system, the device processing circuit 15 provides signal conditioning, data compression and data storage, while the operations 18/remote 19 processor provides data decompression and image processing.

It will be appreciated that the various memories discussed may be implemented as one or more memory units. Non-volatile memory is used to store the compressed data and instructions so that the device can function without continuous power. Volatile memory (RAM and cache) may be used to temporarily hold raw data and intermediate computations.

Terms such as "top", "bottom", "distal", "proximate" "downhole", "uphole", "below," "above," "upper, downstream," are used herein for simplicity in describing relative positioning of elements of the casing or device, as depicted in the drawings or with reference to the casing datum. Terms such as "axial," "circumferential," "longitudinal," "azimuthal," are used for describing orientation of the typically cylindrical-form-factor of the casing, imaging device and thus coordinate frame. Although the present invention has been described and illustrated with respect to preferred embodiments and preferred uses thereof, it is not to be so limited since modifications and changes can be made therein which are within the full, intended scope of the invention as understood by those skilled in the art.

What is claimed is:

1. A method of inspecting a wellbore comprising:
   deploying an imaging tool into and axially through a casing of the wellbore;
   imaging the casing with a radial array of ultrasound transducers to create an ultrasound image;
   analyzing the ultrasound image to detect one or more features that identify a casing connector;
   locating a sealing band in the ultrasound image at a predetermined offset from the one or more detected features; and
   analyzing the sealing band in the ultrasound image to determine a connection quality of the casing connector to the casing.

2. The method of claim 1, wherein the sealing band is next to the one or more features which sealing band corresponds to a metal-to-metal sealing interface between the casing and the casing connector, and wherein analyzing the sealing band in the ultrasound image comprises determining a sealing quality of the casing connector to the casing.

3. The method of claim 1, wherein the sealing band corresponds to a plurality of threads connecting the casing and the casing connector, and wherein analyzing the sealing band in the ultrasound image comprises determining a mechanical connection strength of the casing connector to the casing.

4. The method of claim 1, wherein the one or more features of the casing connector comprises at least one of: one or more threads, a torque shoulder, or a dope relief.

5. The method of claim 1, further comprising filtering out reflections in the ultrasound image from at least one of: an inner surface or an outer surface of the casing.

6. The method of claim 1, further comprising converting a magnitude of reflection energy in the ultrasound image to a sealing contact pressure.

7. The method of claim 1, wherein analyzing the images comprises identifying a spiral of alternating high-intensity/low-intensity reflections in the ultrasound image.

8. The method of claim 1, further comprising determining a baseline signal strength of reflections from an inner surface of the casing and modifying portions of the ultrasound image of the casing connector using the determined baseline.

9. The method of claim 1, wherein the sealing quality is determined inversely with respect to signal intensity and from continuity of a sealing interface.

10. The method of claim 1, wherein analyzing the ultrasound image comprises processing the ultrasound image with a machine learning model to output at least one of: a prediction or classification that the ultrasound image contains said casing connection or the connection quality of the casing connection.

11. The method of claim 1, further comprising estimating a leakage parameter based at least in part on the determined connection quality and a leakage model.

12. The method of claim 1, wherein the imaging tool images the casing in a first imaging mode and images the sealing band in a second imaging mode.

13. An imaging system for inspecting casing connections in a wellbore comprising:
   an elongate body disposable in a casing;
   means for moving the elongate body axially through the casing;
   a radial array of ultrasound transducers connected to the elongate body;
   a memory for storing an ultrasound image from the radial array as the radial array is deployed through the casing; and
   a processor configured to process the ultrasound image in the memory through executing of program instructions by:
      analyzing the ultrasound image to detect one or more features identifying a casing connector;
      locating a sealing band in the ultrasound image at a predetermined offset from the one or more detected features; and
      analyzing the sealing band in the ultrasound image to determine a connection quality of the casing connector with the casing.

14. The system of claim 13, wherein the sealing band is next to the one or more features which sealing band corresponds to a metal-to-metal sealing interface between the casing and the casing connector, and wherein analyzing the sealing band in the ultrasound image comprises determining a sealing quality of the casing connector with the casing.

15. The system of claim 13, wherein the sealing band corresponds to a plurality of threads connecting the casing and the casing connector, and wherein analyzing the sealing band in the ultrasound image comprises determining a mechanical connection strength of the casing connector with the casing.

16. The system of claim 13, wherein the processor is further configured to at least filter out one or more reflections in the ultrasound image from at least one of: an inner surface or an outer surface of the casing.

17. The system of claim 13, wherein the processor is further configured to at least store a machine learning model and processing the ultrasound image with the machine learning model to output at least one of: a prediction or a classification that the ultrasound image contains said casing connection or the connection quality of the casing connection.

18. The system of claim 13, wherein the processor is further configured to at least estimate a leakage parameter based at least in part on the determined connection quality and a leakage model.

19. The system of claim 13, wherein the radial array is arranged on a frustoconical surface with a cone angle of 0-40°.

20. A method of inspecting a wellbore comprising:
   deploying an imaging tool into and axially through a casing of the wellbore;
   imaging the casing with a radial array of ultrasound transducers to create an ultrasound image, the radial array sonifying the casing at an angle of incidence greater than 0° and less than 40°;
   analyzing the ultrasound image to detect one or more features comprising at least one of: a thread, a torque shoulder, or a dope relief, the feature identifying a casing connector;
   locating a sealing band in the ultrasound image at a predetermined offset from the one or more detected features; and
   analyzing the sealing band in the ultrasound image to determine a connection quality of the casing connector to the casing.

* * * * *